United States Patent [19]
Hughes

[11] Patent Number: 6,122,334
[45] Date of Patent: *Sep. 19, 2000

[54] PILOT SIGNAL DETECTION FILTER FOR A WIRELESS COMMUNICATION DEVICE

[76] Inventor: Robbin D. Hughes, 10760 Aderman Ave., #87, San Diego, Calif. 92126

[*] Notice: This patent issued on a continued prosecution application filed under 37 CFR 1.53(d), and is subject to the twenty year patent term provisions of 35 U.S.C. 154(a)(2).

[21] Appl. No.: 08/872,328

[22] Filed: Jun. 10, 1997

[51] Int. Cl.[7] .................................................. H04B 1/00
[52] U.S. Cl. ........................ 375/350; 375/340; 370/491; 370/500
[58] Field of Search ........................ 375/285, 340, 375/346, 348, 350, 229, 230; 364/724.11; 370/252, 491, 500; 708/314

[56] References Cited

U.S. PATENT DOCUMENTS

| | | |
|---|---|---|
| 4,757,319 | 7/1988 | Lankl ...................................... 342/378 |
| 5,490,165 | 2/1996 | Blakeney, II et al. ................... 375/205 |
| 5,506,865 | 4/1996 | Weaver, Jr. .............................. 375/205 |
| 5,577,022 | 11/1996 | Padovani et al. ......................... 370/13 |

*Primary Examiner*—Chi H. Pham
*Assistant Examiner*—Jean B. Corrielus
*Attorney, Agent, or Firm*—Philip R. Wadsworth; Roger W. Martin; Charles D. Brown

[57] ABSTRACT

A novel and improved apparatus for a wireless communication device, which provides fast detection and validation of pilot signals while minimizing the probability of false detection. In the apparatus a searcher subsystem generates a pilot energy sample corresponding to a pilot signal, which is provided to a pilot signal detection filter, comprising two parallel branches. The first branch calculates a weighted historical average of a signal strength of the pilot signal in response to the pilot energy sample, the second branch verifies the pilot energy sample in a state machine, wherein transitions of the state machine are proportional to a magnitude of the pilot energy sample. A pilot detection signal is generated if either the weighted historical average exceeds selected threshold, or a state of the state machine exceeds a maximum value of the states.

10 Claims, 4 Drawing Sheets

PILOT SIGNAL DETECTION FILTER FOR A WIRELESS COMMUNICATION DEVICE

BACKGROUND OF THE INVENTION

I. Related Applications

The present application is related to a co-pending U.S. Patent Application entitled "DYNAMIC FILTERING OF PILOT ENERGY SAMPLES IN A WIRELESS COMMUNICATION SYSTEM", filed on Jun. 10, 1997 (Ser. No. 08/872,111), and assigned to the assignee of the present invention.

II. Field of the Invention

The present invention relates to wireless communication systems. More particularly, the present invention relates to a novel and improved pilot signal detection filter for a wireless communication device which provides fast detection and validation of pilot signals while minimizing the probability of false detections.

III. Description of the Related Art

In the field of wireless communications, several technology-based standards exist for controlling communications between a mobile station, such as a cellular telephone, Personal Communication System (PCS) handset, or other remote subscriber communication device, and a wireless base station. These include both digital-based and analog-based standards. For example, among the digital-based cellular standards are the Telecommunications Industry Association/Electronic Industries Association (TIA/EIA) Interim Standard IS-95 series including IS-95A and IS-95B, entitled "Mobile Station—Base Station Compatibility Standard for Dual-Mode Wideband Spread Spectrum Cellular System." Similarly, among the digital-based PCS standards are the American National Standards Institute (ANSI) J-STD-008 series, entitled "Personal Station—Base Station Compatibility Requirements for 1.8 to 2.0 GHz Code Division Multiple Access (CDMA) Personal Communication Systems." Other non-CDMA based digital standards include the time-division multiple access (TDMA) based Global System for Mobile Communications (GSM), and the U.S. TDMA standard TIA/EIA IS-54 series.

The spread spectrum modulation technique of CDMA has significant advantages over other modulation techniques for multiple access communication systems. The use of CDMA techniques in a multiple access communication system is disclosed in U.S. Pat. No. 4,901,307, issued Feb. 13, 1990, entitled "SPREAD SPECTRUM MULTIPLE ACCESS COMMUNICATION SYSTEM USING SATELLITE OR TERRESTRIAL REPEATERS", assigned to the assignee of the present invention, of which the disclosure thereof is incorporated by reference herein.

Space or path diversity is obtained by providing multiple signal paths through simultaneous links from a mobile user through two or more cell-sites. Furthermore, path diversity may be obtained by exploiting the multipath environment through spread spectrum processing by allowing a signal arriving with different propagation delays to be received and processed separately. Examples of path diversity are illustrated in U.S. Pat. No. 5,101,501, issued Mar. 31, 1992, entitled "SOFT HANDOFF IN A CDMA CELLULAR TELEPHONE SYSTEM", and U.S. Pat. No. 5,109,390, issued Apr. 28, 1992, entitled "DIVERSITY RECEIVER IN A CDMA CELLULAR TELEPHONE SYSTEM", both assigned to the assignee of the present invention and incorporated by reference herein.

The deleterious effects of fading can be further controlled to a certain extent in a CDMA system by controlling transmitter power. A system for cell-site and mobile unit power control is disclosed in U.S. Pat. No. 5,056,109, issued Oct. 8, 1991, entitled "METHOD AND APPARATUS FOR CONTROLLING TRANSMISSION POWER IN A CDMA CELLULAR MOBILE TELEPHONE SYSTEM", U.S. Ser. No. 07/433,031, filed Nov. 7, 1989, also assigned to the assignee of the present invention. The use of CDMA techniques in a multiple access communication system is further disclosed in U.S. Pat. No. 5,103,459, issued Apr. 7, 1992, entitled "SYSTEM AND METHOD FOR GENERATING SIGNAL WAVEFORMS IN A CDMA CELLULAR TELEPHONE SYSTEM", assigned to the assignee of the present invention, of which the disclosure thereof is incorporated by reference herein.

The aforementioned patents all describe the use of a pilot signal used for acquisition in a CDMA wireless communication system. At various times when a wireless communication device such as a cellular or PCS telephone is energized, it undertakes an acquisition procedure which includes, among other things, searching for and acquiring the pilot channel signal from a base station in the wireless communication system. For example, demodulation and acquisition of a pilot channel in a CDMA system is described in more detail in copending U.S. patent application Ser. No. 08/509,721, entitled "METHOD AND APPARATUS FOR PERFORMING SEARCH ACQUISITION IN A CDMA COMMUNICATION SYSTEM," assigned to the assignee of the present invention and incorporated herein by reference. When more than one pilot channel can be acquired by the wireless communication device, it selects the pilot channel with the strongest signal. Upon acquisition of the pilot channel, the wireless communication device is rendered capable of acquiring additional channels from the base station that are required for communication. The structure and function of these other channels is described in more detail in the above referenced U.S. Pat. No. 5,103,459 and will not be discussed in detail herein.

The base station pilot signals are divided into four sets based on their pilot signal strengths as measured at the mobile station. The first set, referred to as the Active Set, comprises base stations which are currently in communication with the mobile station. The second set, referred to as the Candidate Set, comprises base stations which have been determined to be of sufficient strength to be of use to the mobile station. Base stations are added to the candidate set when their measured pilot energy exceeds a predetermined threshold $T_{ADD}$. The third set is Neighbor Set which is the set of base stations which are in the vicinity of the mobile station (and which are not included in the Active Set or the Candidate Set). And the fourth set is the Remaining Set which consists of all other base stations.

In an IS-95-A communication system, the mobile station sends a Pilot Strength Measurement Message when it finds a pilot of sufficient strength that is not associated with any of the Forward Traffic Channels currently being demodulated or when the strength of a pilot that is associated with one of the Forward Traffic Channels being demodulated drops below a threshold for a predetermined period of time. The mobile station sends a Pilot Strength Measurement Message following the detection of a change in the strength of a pilot under the following three conditions:

1. The strength of a Neighbor Set or Remaining Set pilot is found above the threshold $T_{ADD}$.
2. The strength of a Candidate Set pilot exceeds the strength of an Active Set pilot by more that a threshold $(T_{COMP})$.

3. The strength of a pilot in the Active Set of Candidate Set has fallen below a threshold ($T_{DROP}$) for greater than a predetermined time period.

The Pilot Strength Measurement Message identifies the base station and the measured pilot energy in decibels.

In a dynamic environment, such as when the mobile station is moving in a car, pilot signals in the active set tend to fade in strength as the mobile station moves away from them, while some pilot signals in the neighbor set tend to increase in strength as the mobile station moves toward them. Often, these changes are dramatic and sudden due to terrestrial topologies such as valleys, mountains, buildings, trees, tunnels, and other obstructions to the transmitted pilot signal. Thus, a mobile station which is moving may come out from behind an obstruction and suddenly encounter a pilot signal that is so strong that it causes interference to the mobile station, preventing it from receiving the forward link signal from the base station with which it is already communicating. This can be catastrophic to the mobile station, causing it to drop a call in progress.

However, a detection circuit that has a quick response to emerging pilots generally is more susceptible to false detections. False detections are clearly undesirable because they cause the mobile station to take actions in preparation for a handoff to a non-existent base station, thereby wasting time and resources. Thus, it is desirable to perform multiple verifications on pilot signal detections in order to prevent these false detections. However, these multiple verifications increase the time required to detect and report on emergent pilot signals. Furthermore, when there are many pilot signals to detect and verify in a serial fashion, multiple verifications of one particular pilot means that it would take longer to detect and verify other potentially strong pilot. Thus, fast response to emerging pilots and minimization of false detections are competing design considerations in the design of a pilot detection circuit for a mobile station.

In a less dynamic environment, such as when the mobile station is stationary or being carried by a pedestrian, there are times when a particular pilot signal may be approaching the threshold $T_{ADD}$ slowly, and vary in strength near the threshold $T_{ADD}$. In this case, it is desirable to detect and promote the pilot signal from the neighbor set to the active set so that it can be used in a soft handoff. However, a detection circuit that is designed to promote stronger pilots more quickly may not be well suited to promoting weaker pilot signals, such as those that are just above $T_{ADD}$. Thus, fast response to strong emerging pilots as well as weaker emerging pilots may be competing design considerations in the design of a pilot detection circuit for a mobile station.

What is needed is a pilot signal detection and verification circuit and method for its use which has a fast response to strong emerging pilot signals as well as weaker emerging pilot signals, while minimizing false detections.

SUMMARY OF THE INVENTION

The present invention is a novel and improved pilot signal detection filter for a wireless communication device which provides fast detection and validation of pilot signals while minimizing the probability of false detections. The method includes the steps of generating a pilot energy sample corresponding to the pilot signal, and filtering the pilot energy sample in a parallel digital filter. A first branch of the parallel digital filter is for calculating a weighted historical average of a signal strength of the pilot signal in response to said pilot energy sample. A second branch of the parallel digital filter is for verifying the pilot energy sample in a state machine, wherein transitions of the state machine are proportional to a magnitude of the pilot energy sample.

In the preferred embodiment, the first branch contains a dynamic filter whose filter length is calculated in response to a number of pilot signals to be searched. Specifically, the calculated filter length of the first branch is inversely proportional to the number of pilot signals to be searched and is inversely proportional to a search window size used to search the pilot signals.

In the preferred embodiment, the second branch of the parallel filter comprises a state machine which promotes a state of the pilot signal if the pilot energy sample is greater than an add threshold, and demotes the state of the pilot signal if the pilot energy sample is less than the add threshold. Specifically, a control processor determines a magnitude of a difference between the pilot energy sample and the add threshold, generates an acceleration factor in response to the magnitude of the difference, and increases the state of said pilot signal in the state machine in response to the acceleration factor.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
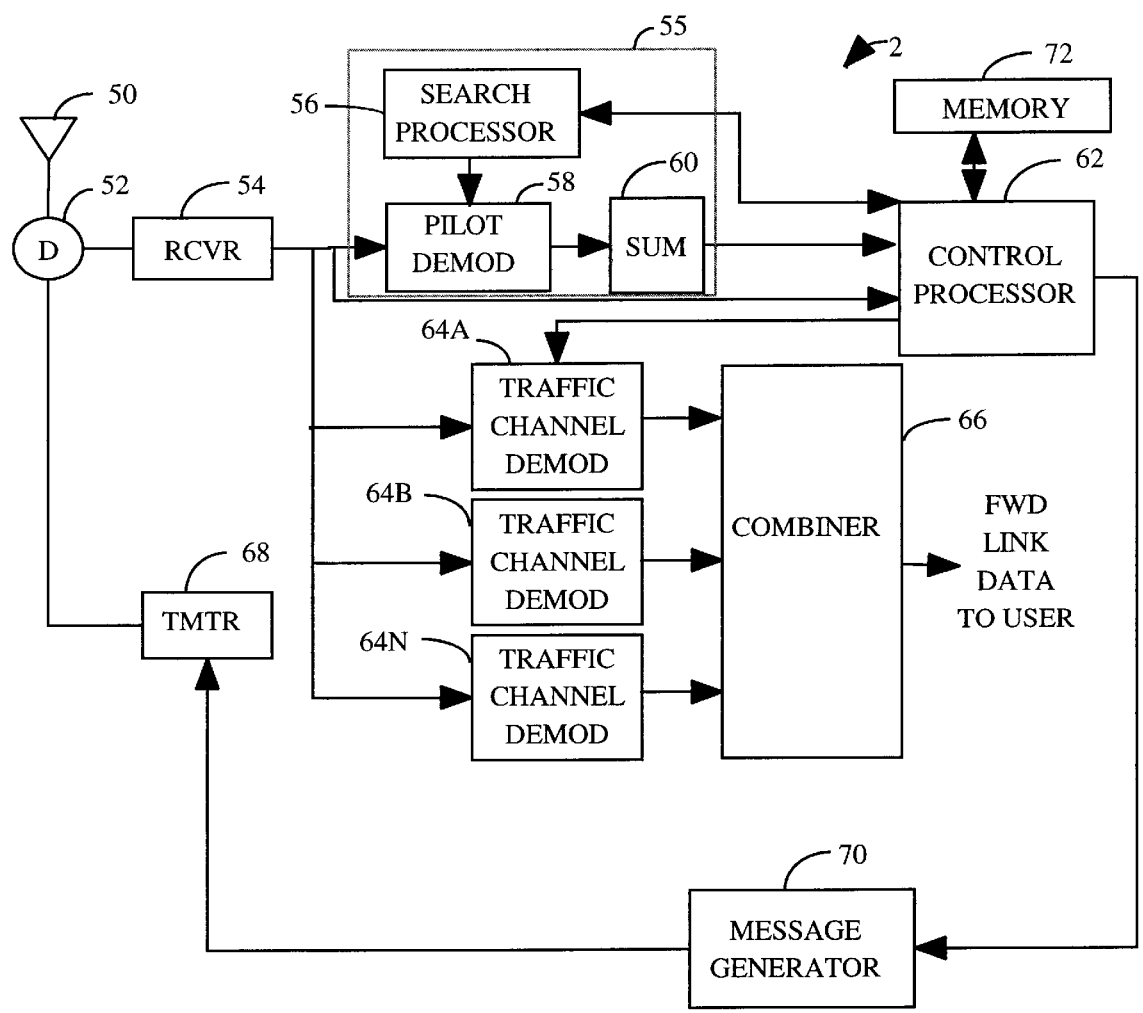
FIG. 1 is a functional block diagram of the apparatus of the present invention.

FIG. 1 illustrates mobile station 2 of the present invention. Mobile station 2 continuously or at intermittent intervals measures the strength of pilot signals of neighboring base stations. Signals received by antenna 50 of mobile station 2 are provided through duplexer 52 to receiver (RCVR) 54 which amplifies, downconverts, and filters the received signal and provides it to pilot demodulator 58 of searcher subsystem 55.

In addition, the received signal is provided to traffic demodulators 64A–64N. Traffic demodulators 64A–64N, or a subset thereof, separately demodulate signals received by mobile station 2. The demodulated signals from traffic demodulators 64A–64N are provided to combiner 66 which combines the demodulated data, which in turn provides an improved estimate of the transmitted data.

Mobile station 2 measures the strength of pilot channels. Control processor 62 provides acquisition parameters to search processor 56. Specifically, control processor 62 provides such acquisition parameters to execute the method described below with reference to FIGS. 2A and 2B. Control processor 62 stores the pilot signal parameters including, in the exemplary CDMA communication system, PN offset and frequency in memory 72. Control processor 62 then accesses memory 72 to determine the scheduling of pilot searches to be executed by searcher subsystem 55. Control processor 62 may be a conventional microprocessor as is known in the art. In the exemplary embodiment of a CDMA communication system, control processor 62 provides a PN offset to search processor 56 in accordance with the next pilot signal to be searched. Search processor 56 generates a PN sequence which is used by pilot demodulator 58 to demodulate the received signal. The demodulated pilot signal is provided to energy accumulator 60 which measures the energy of the demodulated pilot signal, by accumulating the energy for predetermined lengths of time as is known in the art, and providing such accumulated energy samples to control processor 62.

Figure 2A:
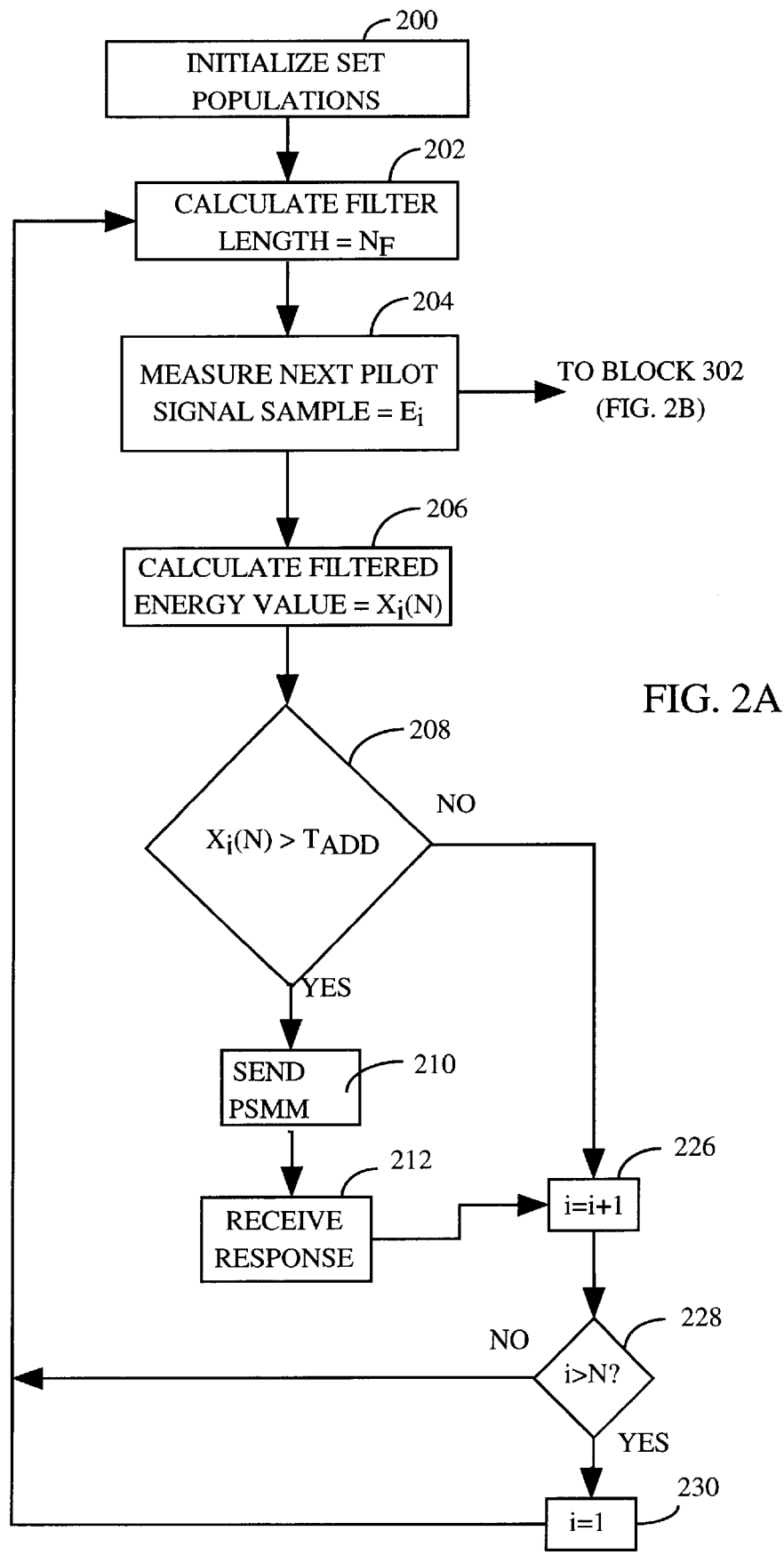
FIG. 2A is a flowchart of a first branch of the parallel filtering method of the present invention.
Figure 2B:
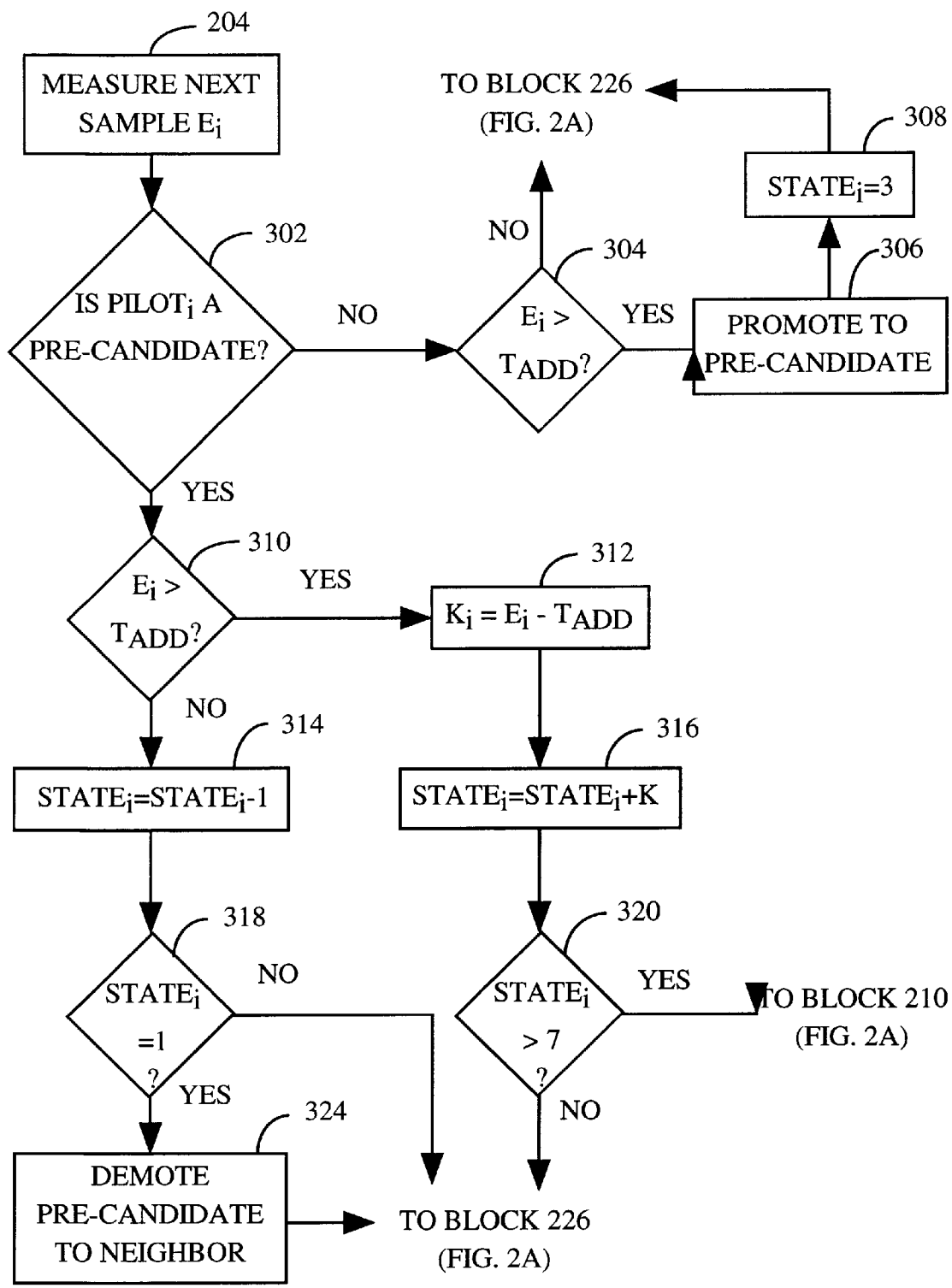
FIG. 2B is a flowchart of a second branch of the parallel filtering method of the present invention.

In the exemplary embodiment, control processor 62 digitally filters the accumulated energy samples according to the parallel methods of FIGS. 2A and 2B, thereby generating a filtered energy value. Control processor 62 then compares the filtered energy value to thresholds $T_{ADD}$ and $T_{DROP}$. $T_{ADD}$ is threshold above which the received signal is of sufficient strength to effectively provide communications with mobile station 2. $T_{DROP}$ is a threshold value below which the received signal energy is insufficient to effectively provide communications with mobile station 2.

Control processor 62 provides the identities of the pilots and their corresponding measured pilot energy values to message generator 70. Message generator 70 generates a Pilot Strength Measurement Message containing the information. The Pilot Strength Measurement Message is provided to transmitter (TMTR) 68, which encodes, modulates, upconverts and amplifies the message. The message is then transmitted through duplexer 52 and antenna 50.

In the present invention, control processor 62 filters the pilot energy according to the parallel methods of FIGS. 2A and 2B. Control processor 62 performs the steps of FIGS. 2A and 2B substantially in parallel for each pilot that is being measured. FIG. 2A illustrates a first branch of the digital filtering method of the present invention, whereas FIG. 2B illustrates a second branch of the digital filtering method of the present invention. Software in control processor 62 performs the steps as illustrated in both the first and second branches.

The process begins in FIG. 2A at block 200 where the mobile station 2 initializes the set populations of the active set, the candidate set, and the neighbor set. This may include receiving a Neighbor List Message from the base station, and storing the contents of such message in memory 72. Additionally, this may include performing an initial pilot signal search upon power up when determining the strongest pilot signal corresponding to the base station with which the mobile station 2 establishes initial communication. The base stations with which the mobile station 2 has established communication are members of the active set. In any event, regardless of the manner in which the set populations are initialized at block 200, the result of block 200 is that the active set contains one or more members, the candidate set may contain zero or more members, and the neighbor set may contain zero or more members. The number of members of the active set shall be referred to herein as $N_A$. The number of members of the candidate set shall be referred to herein as $N_C$, and the number of members of the neighbor set shall be referred to herein as $N_N$.

In block 202, the control processor 62 calculates the desired filter length, $N_F$, that will make the filter time constant of the first branch of the parallel filter remain substantially fixed, regardless of the size of the set populations to be searched. The control processor 62 calculates this first branch filter length according to the following equation:

$$N_F = \frac{1}{W \times (N_A + N_C + N_N)}. \quad (1)$$

where W is the window size of the search window. In the exemplary CDMA system, the window size is measured in units of PN chips, as is disclosed in the above-referenced U.S. patent application Ser. No. 08/509,721.

Thus, the length of the first branch of the filter is inversely proportional to the total number of members of all of the set populations. For example, if there are a large number of members of the neighbor list, and each must be searched using the same searcher resources of FIG. 1, the filter length, $N_F$, for the first branch of the parallel filter would be relatively short compared to the case where there are fewer neighboring pilots to be searched. As a consequence, even in a complex communication system in a crowded urban area where there may be on the order of tens of neighboring pilots on various frequencies to be searched, the present invention sets the filter length such that the time constant is substantially fixed, allowing more pilot signals to be searched in a timely fashion.

In block 204, a pilot energy sample, $E_i$, corresponding to the next pilot signal to be searched, is measured in accumulator 60 and provided to control processor 62. The order in which the various members of the set populations are searched, i.e. the search schedule, may be determined by control processor 62 in a number of ways. For example, in the preferred embodiment, all of the active set pilots are first searched, and then all of the candidate set pilots, and then only one of the neighbor set pilots, followed by again searching all of the active pilots and candidate pilots. The particular search schedule is not critical to the present invention, but may be varied based upon the anticipated operating environment.

At block 206, the control processor 62 calculates the filtered energy value, $X_N$. In the preferred embodiment, $X_N$ is a weighted historical average according to the following equation:

$$X_i(N) = \frac{(N-1)}{N} X_i(N-1) + \frac{1}{N} E_i \quad (2)$$

As can be seen from Equation (2), the current filtered energy value $X_N$ weighs the previous filtered energy value, $X_{N-1}$, by more than it weighs the $E_i$ value. Thus, the first branch of the parallel digital filtering method of the present invention is a dynamic filter which provides smoothing of the input samples, resulting in a more stable determination of pilot signal energy than would be produced if each sample were individually considered. Additionally, the filter coefficients (i.e. the relative weights of the component samples), for the first branch of the parallel filter are determined in response to the total number of pilots in each of the active, candidate, and neighbor sets as shown in Equation (1). It should be noted that other embodiments may use less than the total number of pilots in all sets, and the present invention encompasses any implementation where the dynamic filter length is inversely proportional to the number of pilot signals in at least one of the sets. It should also be noted that any other weighted average may be used without departing from the spirit of the present invention, so long as the dynamic filter length $N_F$ of the first branch is determined in response to the number of pilots to be searched. For example, in other embodiments, the previous filtered energy value $X_i(N-1)$ may be weighed by less than $(N-1)/N$, and $Ei$ by more than $1/N$.

In block 208, the filtered energy value $X_i(N)$ is compared with the threshold $T_{ADD}$ to determine whether it should be promoted into the active set population. For example, if the particular pilot being measured is determined to have a filtered energy value greater than $T_{ADD}$, then it should be promoted to the active set. On the other hand, if the particular pilot being measured is determined to have a filtered energy value less than $T_{ADD}$, it should not be promoted to the active set. If $X_i(N)$ is greater than $T_{ADD}$ then at block 210, a Pilot Strength Measurement Message (PSMM) is generated by message generator 70, and sent to the base station, proposing that the particular pilot either be promoted to the active set. The base station sends a response message either accepting or rejecting the proposed promotion and in block 212 the mobile station 2 receives the response message.

If, however, back at block 208 the filtered energy value $X_i(N)$ is less than the threshold $T_{ADD}$, then no PSMM message is sent. In either case, the variable, i, is incremented at block 226. At decision 228, the variable i is compared to N. If i is greater than N at decision 228, then all of the scheduled pilots have been searched, and the variable i is reset to 1 at block 230. If i is not greater than N at decision 228, then there are still additional pilots scheduled to be searched in this cycle, and so the flow returns to block 202 where the filter length $N_F$ is recalculated as described above with reference to block 202.

The second branch of the parallel filtering method of the present invention is for verifying the pilot energy sample in a state machine, wherein transitions of the state machine are proportional to a magnitude of the pilot energy sample. One embodiment of the method is illustrated in FIG. 2B. FIG. 2B begins at block 204 which is the same as block 204 of FIG. 2A. Thus, the parallel filtering method of the present invention splits at block 204. When an energy sample, $E_i$, for the i-th pilot is measured by accumulator 60, control processor 62 also initiates the steps of FIG. 2B in parallel with those of FIG. 2A.

In block 302 control processor 62 determines whether the pilot is a "pre-candidate." A pre-candidate is a pilot signal that has been measured at least once above the threshold $T_{ADD}$. Pre-candidates are subjected to the verification procedures described herein with respect to the rest of FIG. 2B. Pre-candidate pilot signals may also be re-visited (i.e. scheduled for signal strength measurement) more often than other pilots of less interest, for example, the rest of the neighbors that have not been measured with a pilot signal strength above $T_{ADD}$.

If the pilot being measured is not a pre-candidate, then the flow continues to decision 304 where control processor 62 determines whether the energy sample $E_i$ is greater than $T_{ADD}$. If the energy sample $E_i$ is greater than $T_{ADD}$, then the pilot being measured is promoted to a "pre-candidate" in block 306. This would correspond to the case where the measured pilot signal is first measured above the threshold $T_{ADD}$. At block 308 the variable $STATE_i$ is initialized to an initial value, which in the exemplary embodiment of FIG. 2B is 3, and the flow proceeds back to block 226 of FIG. 2A where the variable i is incremented. If, however, $E_i$ is not greater than $T_{ADD}$ at decision 304, then the pilot signal is not of interest, and the flow proceeds to block 226 of FIG. 2A where the variable i is incremented.

However, if it is determined back at decision 302 that the i-th pilot is already a pre-candidate, the flow proceeds to decision 310 where it is determined whether $E_i$ is greater than $T_{ADD}$. If $E_i$ is greater than $T_{ADD}$, then a variable $K_i$ is set equal to the amount (in dB) by which $E_i$ exceeds $T_{ADD}$. This variable $K_i$ is referred to herein as an "acceleration factor" because, as will be seen, it determines how quickly the measured pilot is reported to the base station in a Pilot Strength Measurement Message (PSMM).

The variable $STATE_i$, which was initialized to 3 in block 308 when this particular pilot signal was first promoted to a pre-candidate at block 306, is incremented by the value of $K_i$ at block 316. At decision 320 it is determined whether the variable $STATE_i$ exceeds a maximum value, which in the exemplary embodiment is 7. If $STATE_i$ exceeds this maximum value, then message generator 70 generates a pilot strength measurement message for transmission to the base station at block 210 of FIG. 2A, reporting the pre-candidate, and requesting that it be added to the active set. The flow then proceeds to block 226 where the variable i is incremented, and the flow continues to measure the next pilot, if any, as previously described above.

If, however, back at decision 310 it is determined that $E_i$ is not greater than $T_{ADD}$, then the flow proceeds to block 314 where the variable $STATE_i$ is decremented. If it is determined at decision 318 that the variable $STATE_i$ has reached a minimum value, which in the exemplary embodiment is 1, then the pre-candidate is demoted back to the neighbor set at block 324, and the flow proceeds as previously described to block 226 of FIG. 2A. This would correspond to the case where a pilot signal, although promoted to a pre-candidate because it exceeded $T_{ADD}$ at some time, has fallen below $T_{ADD}$ enough times that it should be demoted back into the neighbor list. In such a case, the demoted pilot signal is preferably visited less often thereafter until it once again exceeds $T_{ADD}$. However, if it is determined at decision 318 that the variable $STATE_i$ does not yet equal the minimum value, then the flow proceeds to block 226 of FIG. 2A where the variable i is incremented, and thereafter proceeds as previously described to measure the next pilot sample.

Figure 3:
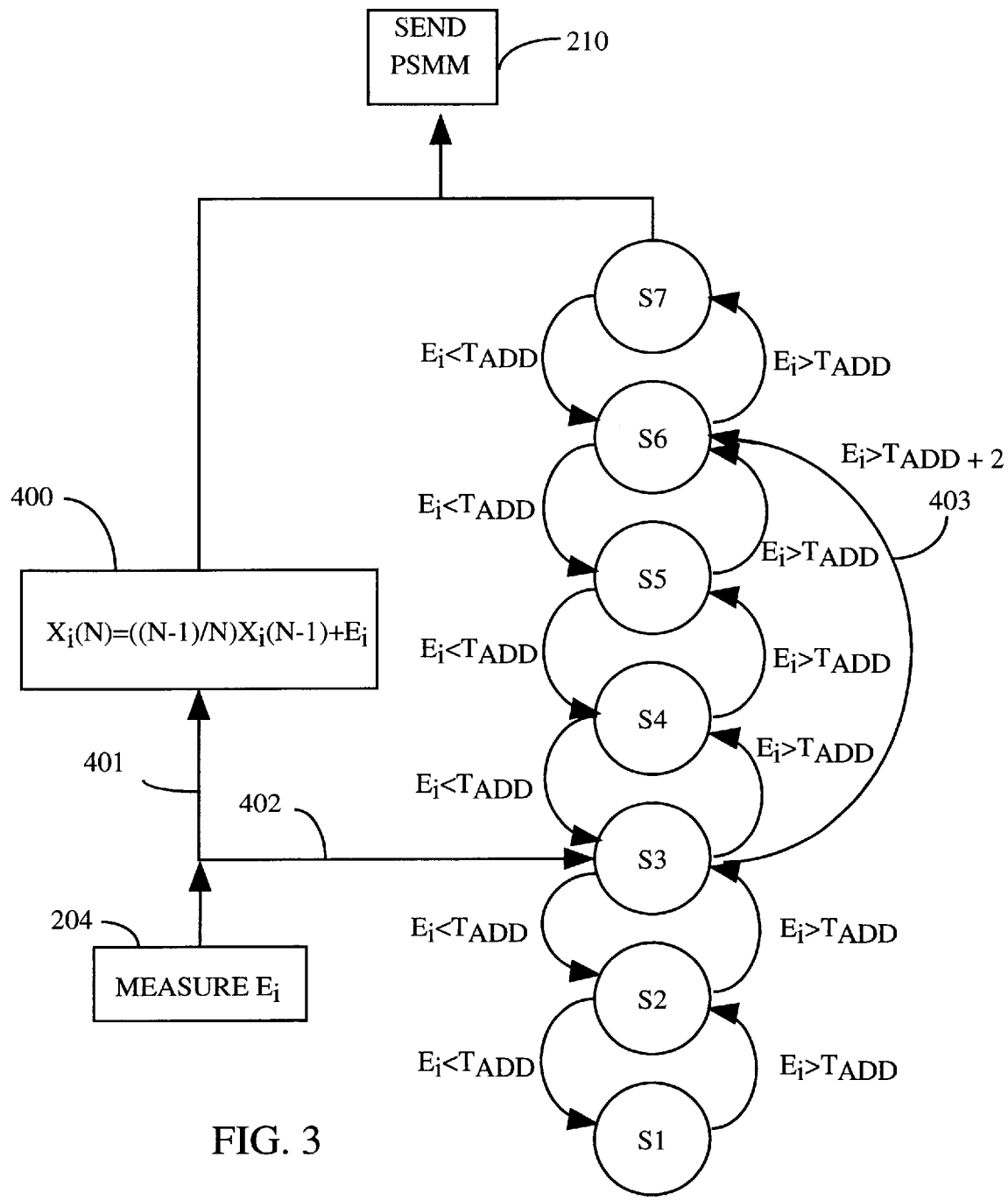
FIG. 3 is a state diagram of the parallel digital filter of FIGS. 2A and 2B.

FIG. 3 further illustrates the parallel digital filtering of the present invention. FIG. 3 represents a state-diagram representation of the flowcharts of FIGS. 2A and 2B. As can be seen from FIG. 3, a particular pilot signal measurement $E_i$ is presented to both the first branch 401 of the digital filter, and the second branch 402 of the digital filter. Block 400 of the first branch corresponds to the dynamic filtering method of FIG. 2A. The state machine of the second branch 402 corresponds to the filtering method of FIG. 2B.

As was discussed previously with respect to FIG. 2B, a pilot signal is first promoted to a pre-candidate when its measured energy sample $E_i$ first exceeds $T_{ADD}$. At that time, it is given an initial $STATE_i$ variable value, and may be thereafter re-visited more often than other pilots which are not pre-candidates. In the illustration of FIG. 3, the $STATE_i$ variable is initially set to 3, corresponding to state S3 of FIG. 3. With each consecutive re-visitation, the pre-candidate's pilot signal strength is re-measured and compared to $T_{ADD}$. If the pre-candidate's pilot signal strength has dropped below $T_{ADD}$, its $STATE_i$ variable is decremented, causing it to descend the state machine chain by one step. However, if the pre-candidate's pilot signal strength continues to be above $T_{ADD}$, its $STATE_i$ variable is incremented by an acceleration factor, $K_i$, which is proportional to the amount that the pre-candidate's pilot signal strength exceeds $T_{ADD}$. Thus, the pre-candidate's pilot signal ascends the state machine chain by K+1 steps. Thus, a pre-candidate whose pilot signal strength is less than one dB greater than $T_{ADD}$ climbs one step to the next higher state. This transition is represented by any one of the upward pointing arrows labeled $E_i > T_{ADD}$. In summary, in the state machine, once the pilot signal is promoted to a pre-candidate it is assigned a state. With each consecutive re-visitation, the $STATE_i$ variable is changed from its present state to an ensuing state that will be higher or lower than the present state depending on the value of the pilot signal strength.

Additionally, if a pre-candidate's pilot signal strength is, for example, 2 dB greater than $T_{ADD}$, then its acceleration factor $K_i$ will equal 2, and it will ascend by an additional two states faster than a pre-candidate which has a signal strength less than 1 dB greater than $T_{ADD}$. Such a transition is illustrated by transition arrow 403 extending from state S3 to state S6. In this manner, the stronger a pre-candidate's pilot signal is with respect to $T_{ADD}$, the sooner it will reach the maximum value for its $STATE_i$ variable, and be reported to the base station in a PSMM at block 210 of FIG. 2A. This ensures that the most important pilots are processed and reported quickly, before they have a chance to interfere with the mobile station's reception so much that they cause it to lose the forward link of the base station with which it is communicating. Conversely, if a pre-candidate's pilot signal strength falls below $T_{ADD}$ for enough times, then it is demoted back into the neighbor set. The maximum value for the $STATE_i$ variable determines the susceptibility of the method to false detections. The higher the maximum value, the more consecutive measurements are required in order to have the pre-candidate reported on.

Thus, it can be seen from FIG. 3 that the method of FIG. 2B (branch 402 of FIG. 3) is advantageous for reporting pilot signals that approach $T_{ADD}$ slowly, or only slightly exceed $T_{ADD}$. These types of pilot signals are still very useful to the mobile station 2, but would be promoted more slowly through the method of FIG. 2A (branch 401 of FIG. 3) due to the fact that the previous filtered energy values, $X_i(N-1)$, for the dynamic filter 400 are weighed more than the current energy sample, $E_i$. Thus, the method of FIG. 2B allows most pilot signals to be promoted quickly, according to their relative strengths, even when they only slightly exceed $T_{ADD}$. Furthermore, the method of FIG. 2B is advantageous in that it minimizes false detections by performing multiple measurements of the same pilot signal to confirm its strength is above $T_{ADD}$ prior to reporting it to the base station at block 322.

Thus the present invention provides a pilot signal detection and verification circuit and method for its use which has a fast response to strong emerging pilot signals as well as weaker emerging pilot signals, while minimizing false detections.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A method for detecting a pilot signal, the method comprising the steps of:
    generating a pilot energy sample corresponding to said pilot signal;
    filtering said pilot energy sample in a first branch of a parallel digital filter, said first branch for calculating a weighted historical average of a signal strength of said pilot signal in response to said pilot energy sample;
    filtering said pilot energy sample in a second branch of said parallel digital filter, said second branch for verifying said pilot energy sample in a state machine, wherein transitions of said state machine between a present state, and an ensuing state are proportional to a magnitude of said pilot energy sample; and
    generating a pilot detection signal if either said weighted historical average exceeds an add threshold, or said ensuing state of said state machine exceeds a maximum value of states of said state machine;
    wherein said step of filtering said pilot energy sample in a first branch of said parallel digital filter comprises the steps of;
    determining a number of pilot signals to be searched;
    calculating a filter length response to said number of pilot signals to be searched; and
    filtering said pilot energy sample according to filter coefficients which are based on said calculated filter length.

2. The method of claim 1 wherein said calculated filter length is inversely proportional to said number of pilot signals to be searched.

3. The method of claim 2 wherein said calculated filter length is inversely proportional to a search window size used to search said pilot signals.

4. The method of claim 1 wherein said step of filtering said pilot energy sample in a second branch of said parallel digital filter comprises the steps of:
    promoting a state of said pilot signal in said state machine if said pilot energy sample is greater than said add threshold; and
    demoting said state of said pilot signal in said state machine if said pilot energy sample is less than said add threshold.

5. The method of claim 4 wherein said step of promoting a state of said pilot signal comprises the steps of:
    determining a magnitude of a difference between said pilot energy sample and said add threshold;
    generating an acceleration factor in response to said magnitude of said difference; and
    increasing said state of said pilot signal in response to said acceleration factor.

6. An circuit for detecting a pilot signal, the circuit comprising:
    a searcher subsystem for generating a pilot energy sample corresponding to said pilot signal; and
    a control processor having a parallel digital filter with a first branch and a second branch, said first branch comprising a dynamic filter for calculating a weighted historical average of a signal strength of said pilot signal in response to said pilot energy sample, said second branch comprising a state machine for verifying said pilot energy sample, wherein transitions of said state machine between a present state and an ensuing state are proportional to a magnitude of said pilot energy sample; said control processor generating a pilot detection signal if either said weighted historical average exceeds an add threshold, or said ensuing state of said state machine exceeds a maximum value of states of said state machine;
    wherein said dynamic filter determines a number of pilot signals to be searched, calculates a filter length in response to said number of pilot signals to be searched, and filters said pilot energy sample according to filter coefficients which are based on said calculated filter length.

7. The circuit of claim 6 wherein said calculated filter length is inversely proportional to said number of pilot signals to be searched.

8. The circuit of claim 7 wherein said calculated filter length is inversely proportional to a search window size used to search said pilot signals.

9. The circuit of claim 6 wherein said state machine promotes a state of said pilot signal if said pilot energy sample is greater than said add threshold, and demotes said state of said pilot signal if said pilot energy sample is less than said add threshold.

10. The circuit of claim 9 wherein said control processor determines a magnitude of a difference between said pilot energy sample and said add threshold, generates an acceleration factor in response to said magnitude of said difference and increases said state of said pilot signal in said state machine in response to said acceleration factor.

* * * * *